Figure 1:
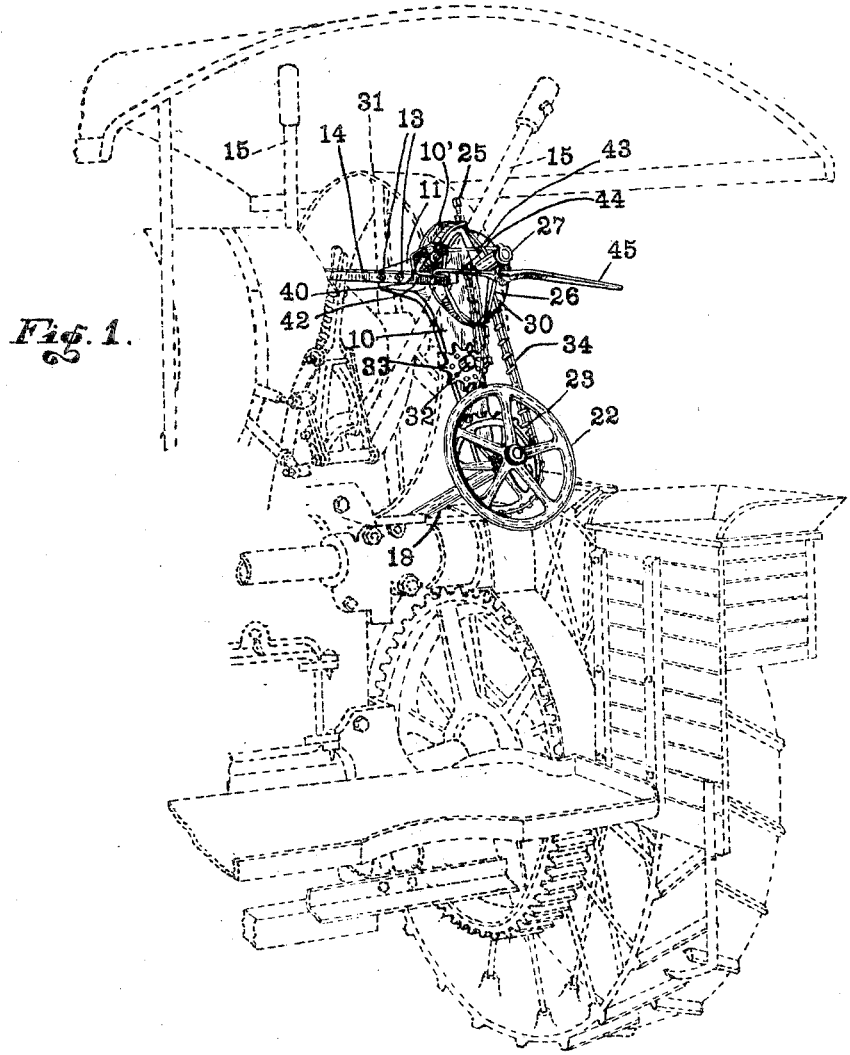

No. 797,557. PATENTED AUG. 22, 1905.
H. C. CLAY.
POWER STEERING GEAR FOR TRACTION ENGINES.
APPLICATION FILED MAY 8, 1905.
3 SHEETS—SHEET 1.

Witnesses
Adelaide Kearns
J. A. Walsh

Inventor
Harry C. Clay
By Bradford & Hood
Attorneys

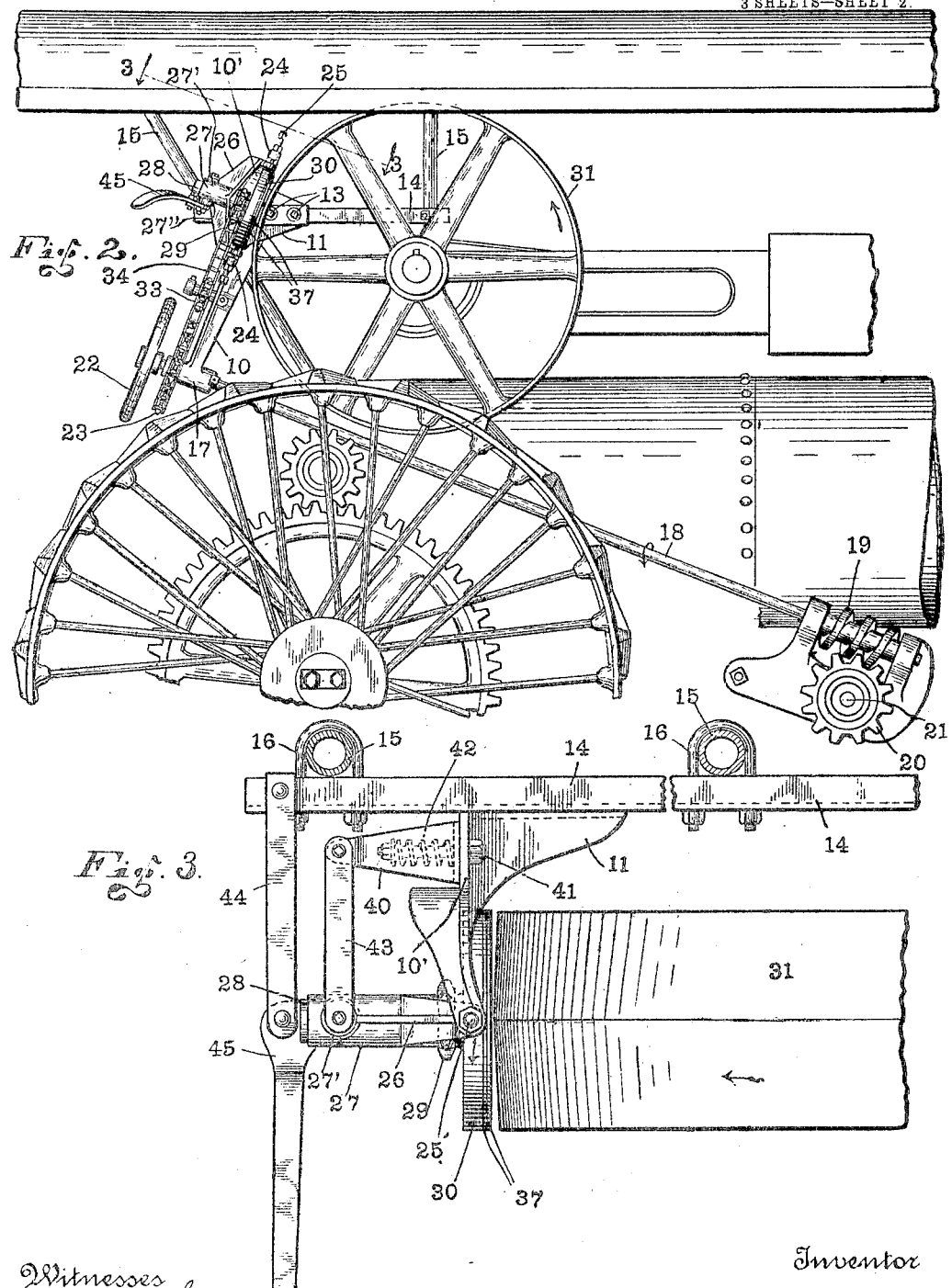

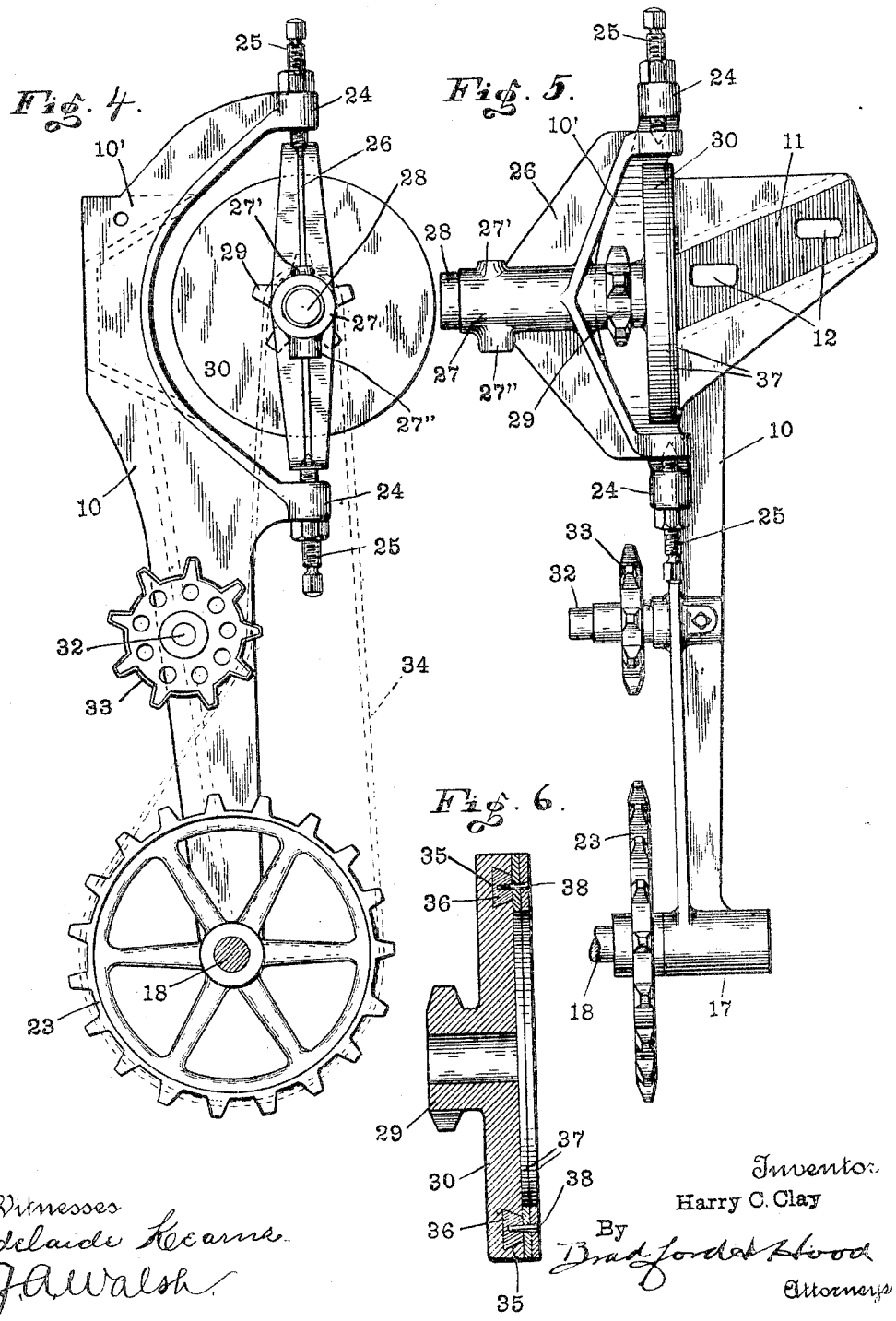

UNITED STATES PATENT OFFICE.

HARRY C. CLAY, OF COLUMBUS, INDIANA, ASSIGNOR TO REEVES & COMPANY, OF COLUMBUS, INDIANA, A CORPORATION OF INDIANA.

POWER STEERING-GEAR FOR TRACTION-ENGINES.

No. 797,557.        Specification of Letters Patent.        Patented Aug. 22, 1905.

Application filed May 8, 1905. Serial No. 259,425.

*To all whom it may concern:*

Be it known that I, HARRY C. CLAY, a citizen of the United States, residing at Columbus, in the county of Bartholomew and State of Indiana, have invented certain new and useful Improvements in Power Steering-Gear for Traction-Engines, of which the following is a specification.

The object of my invention is to provide a structure which may be readily attached to a traction-engine and by means of which the operation of shifting and steering wheels may be accomplished by the constantly-rotating fly-wheel or belt-pulley of the engine.

The accompanying drawings illustrate my invention.

Figure 1 is a perspective view of my improvement, showing its position relative to the adjacent portions of a traction-engine indicated in dotted lines. Fig. 2 is a side elevation of the rear end of a traction-engine equipped with my improved device; Fig. 3, a plan of my attachment; Fig. 4, an end elevation of my device; Fig. 5, a side elevation, and Fig. 6 a sectional detail of the friction-disk.

In the drawings, 10 indicates a main bracket having a portion 11 provided with bolt-perforations 12, through which suitable attaching-bolts 13 may be passed to secure the device to any suitable bar 14, which bar in the drawings is shown attached to the awning-standards 15 by means of suitable clips 16. The slots 12 are elongated in order to provide for slight adjustment of the bracket on the bar 14 for a purpose which will appear. Formed at the lower end of bracket 10 is a journal-bearing 17, which is adapted to receive the rear end of the steering-shaft 18, this shaft being the one ordinarily found in traction-engines, with its forward end provided with a worm 19, meshing with a worm-wheel 20, carried by the chain-shaft 21. The steering-shaft 18 is usually provided with a hand-wheel 22, by means of which the engineer may rotate the shaft in either direction, and this hand-wheel I do not permanently remove; but I provide a sprocket-wheel 23, which is adapted to be secured to the shaft 18 immediately adjacent the outer or rear end of the journal-bearing 17.

The bracket 10 is provided with a pair of vertically-separated ears 24 24, each of which carries a pivot-screw 25, between the adjacent ends of which is pivoted a disk-bracket 26. The disk-bracket 26 is provided at its middle with a journal-bearing 27, within which is journaled a short shaft 28, which carries at its inner end a sprocket-wheel 29, arranged in alinement with a sprocket-wheel 23, and a friction-disk 30, which is adapted to frictionally engage the periphery of the engine fly-wheel 31. The wheel 29 and disk 30 may conveniently be made integral.

Secured to bracket 10 at an intermediate point is a stud-shaft 32, upon which is journaled an idler-sprocket 33, and a sprocket-chain 34 is passed around the two wheels 23 and 29, one side of the chain being engaged by the idler in order that the bight of the chain immediately below the sprocket-wheel 29 may be substantially symmetrically arranged with relation to the axis of swing of the bracket 26, so that the slight oscillation of the bracket 26 on the screws 25 will not materially affect the running of the chain over the sprocket-wheels.

The friction-disk 30 may be provided with any suitable frictional surface on its face; but I have found the construction illustrated in Fig. 6 to be very convenient. For this purpose I form a dovetailed annular groove 35 in the face of disk 30 and fill this groove with a soft metal, such as lead 36. I then provide one or more annuli 37, of leather or other suitable material, and secure these to the face of the disk 30 by driving ordinary metal shoe-pegs 38 through the leather into the lead 36. This construction serves to hold the annuli 37 in position, but permits their easy removal and renewal without the use of special tools.

In operation the bracket 10 is secured in such position that the disk 30 will lie close to the face of the fly-wheel 31, as shown in Fig. 3, and in order to make it easy to swing this disk so that it may be brought into frictional contact with the fly-wheel upon either side of the axis defined by screws 25 I provide the following structure: An L-shaped bracket 40 is provided with its foot resting upon the portion 10' of the bracket 10. A bolt 41 is passed through the portion 10' of the bracket 10 and through the foot of the bracket 40, and a spring 42 (see dotted lines, Fig. 3) is placed under compression between the foot of bracket 40 and the outer end of bolt 41, so as to normally serve to hold the bracket 41 firmly on its foot on the bracket 10. A link 43 has one end attached to bracket 40 and the other end attached to the bearing member 27 at the point 27'. Pivoted to the bar 14 is one end of a link 44, the opposite end of which is pivoted to the knee of a bell-crank lever 45, the short arm of said lever being pivoted to the bearing member 27 at the point 27'', which is preferably vertically beneath the point 27'. The outer end or long arm of the bell-crank lever 45 is extended to serve as an operating-handle. Under normal conditions spring 42 serves to hold bracket 40 at right angles to the portion 10' of the bracket 10 and in this position serves to hold the friction-disk 30 in its medial position, as shown in Fig. 3. Supposing that the engine be running over—i. e., the fly-wheel to be rotating in the direction indicated by the arrow—if the engineer swings lever 45 from him (to the right in Fig. 3) disk 30 will be swung so as to bring that portion of the annulus 37 into frictional contact with pulley 31 to cause the disk 30 to rotate in the direction indicated by the arrow in Fig. 3, and this, through the structure described, will cause the steering-shaft 18 to rotate in the direction indicated by the arrow. As much or as little movement of the shaft 18 may be obtained as desired by proper manipulation of the lever 45. The movement of lever 45 in the direction indicated will, through the short arm of the lever, exert a push upon link 43, thus tending to tip the bracket 40 on one edge (the upper edge of Fig. 3) against the action of the spring 42; but as soon as the pressure on the lever is released the spring will serve to return the parts to the normal position shown in Fig. 3. A pull on the lever 45 toward the operator will cause the parts to swing in the direction opposite to that already described, thus bringing the diametrically opposite portion of the annuli 37 into frictional contact with the fly-wheel, thus producing a reverse direction of movement of the shaft 18. This action will exert a pull on link 43, thus tending to pull the bracket 40 over the other edge, (the lower edge of Fig. 3,) the spring 42 in the same manner resisting this movement and serving to return the parts to normal as soon as the pull on the lever 43 is released. The swinging movement of the disk 30 is very small, the amount being exaggerated in Fig. 3 of the drawings for the sake of clearness, and as the parts return immediately to the normal or intermediate position upon the release of pressure upon the lever 45 and as the fly-wheel or pulley moves at a considerable peripheral speed when the machine is moving along a road the ease and sensitiveness of adjustment of the steering-gear will be very great.

I am well aware that power steering devices have been provided for traction-engines; but so far as I am aware these devices all require a somewhat complicated apparatus which generally require some remodeling of the existing and usual type of construction.

By my construction it is not necessary to alter the existing structure of the traction-engine, the complete structure being readily attachable adjacent the fly-wheel, and by reason of the slots 12 the structure as a whole may be shifted to and from the periphery of the fly-wheel to make room for the driving-belt.

I claim as my invention—

1. A power steering-gear for traction-engines consisting of, a friction-disk, means for supporting said disk adjacent the face of the engine-pulley with its axis substantially radial to said pulley, intermediate driving connections between said friction-disk and the steering-gear, and means for swinging said disk in a plane substantially radial to the engine-pulley whereby the face of the friction-pulley may be brought into contact with the engine-pulley on either side of the axis of swing of the disk to rotate said disk in either direction.

2. A power steering-gear for traction-engines consisting of, a friction-disk, means for supporting said disk adjacent the face of the engine-pulley with its axis substantially radial to said pulley, intermediate driving connections between said friction-disk and the steering-gear, means for swinging said disk in a plane substantially radial to the engine-pulley whereby the face of the friction-pulley may be brought into contact with the engine-pulley on either side of the axis of swing of the disk to rotate said disk in either direction, and means for normally holding said disk in contact with the engine-pulley.

3. A power-steering-gear attachment for traction-engines consisting of, a main bracket, means for attaching said bracket to a suitable support, a disk-bracket pivotally mounted on a main bracket, a friction-disk journaled in said disk-bracket and provided with a friction-face, means for swinging the disk-bracket on the main bracket, and intermediate connections between said disk and the steering-gear shaft.

4. A power-steering-gear attachment for traction-engines consisting of, a main bracket, means for attaching said bracket to a suitable support, a disk-bracket pivotally mounted on a main bracket, a friction-disk journaled in said disk-bracket and provided with a friction-face, means for swinging the disk-bracket on the main bracket, means for normally holding said disk-bracket in intermediate position, and intermediate connections between said disk and the steering-gear shaft.

5. A power-steering-gear attachment for traction-engines consisting of, a main bracket provided with a journal-bearing adapted to receive the steering-gear shaft, a friction-disk bracket pivotally mounted on the main bracket, a friction-disk journaled in said disk-bracket and adapted to engage the engine-pulley, a pair of sprocket-wheels one connected to the disk and the other adapted to be connected to the steering-shaft, a chain connecting said wheels, and means for swinging the disk-bracket upon its pivot, for the purpose set forth.

6. A power-steering-gear attachment for traction-engines consisting of, a main bracket provided with a journal-bearing adapted to receive the steering-gear shaft, a friction-disk bracket pivotally mounted on the main bracket, a friction-disk journaled in said disk-bracket and adapted to engage the engine-pulley, a pair of sprocket-wheels one connected to the disk and the other adapted to be connected to the steering-shaft, a chain connecting said wheels, means for swinging the disk-bracket upon its pivot, and means for normally holding the friction-disk in intermediate position, said means consisting of the bracket 40, spring-fastening 41 42 and link 43, for the purpose set forth.

7. A power-steering-gear attachment for traction-engines consisting of, a main bracket provided with a journal-bearing adapted to receive the steering-gear shaft, a friction-disk bracket pivotally mounted on the main bracket, a friction-disk journaled in said disk-bracket and adapted to engage the engine-pulley, a pair of sprocket-wheels one connected to the disk and the other adapted to be connected to the steering-shaft, a chain connecting said wheels, a lever having one end attached to the disk-bracket, and means for yieldingly holding the disk-bracket in medial position.

8. A power-steering-gear attachment for traction-engines consisting of, a main bracket provided with a journal-bearing adapted to receive the steering-gear shaft, a friction-disk bracket pivotally mounted on the main bracket, a friction-disk journaled in said disk-bracket and adapted to engage the engine-pulley, a pair of sprocket-wheels one connected to the disk and the other adapted to be connected to the steering-shaft, a chain connecting said wheels, and means for normally holding the friction-disk in intermediate position, said means consisting of the bracket 40, spring-fastening 41 42 and link 43.

In witness whereof I have hereunto set my hand and seal, at Columbus, Indiana, this 27th day of April, A. D. 1905.

HARRY C. CLAY. [L. S.]

Witnesses:
  W. B. DENISON,
  A. C. DENISON.